Patented Oct. 15, 1940

2,218,221

UNITED STATES PATENT OFFICE 2,218,221

THERMOPHILIC STARCH

Herman H. Schopmeyer and George E. Felton, Hammond, Ind., assignors to American Maize-Products Company, a corporation of Maine No Drawing. Application September 13, 1939, Serial No. 294,672

5 Claims. (Cl. 127—70)

Our invention relates to a process of producing sterile or substantially bacteria-free starch and more particularly to the treatment of starch with hydrogen peroxide to kill harmful bacteria and thereby render the starch suitable for edible purposes without harming any of the desired physical and chemical properties of the starch.

Until recent years there have been no definite regulations or standards for the purity of edible starches. However, in the last few years the problem of producing a starch substantially free of thermophilic bacteria, which are not killed in the canning operations, has been investigated extensively by the industry, and the National Canners Association have set up certain standards for testing starches for their bacteria content and have specified the permissible maximum amounts of bacteria that the starch used for canning purposes may contain. As a result of this new standardization and increasing demand for thermophilic starch many attempts have been made to produce such a starch. Some of these have been successful insofar as the killing of bacteria is concerned, but have not been satisfactory in other respects such as modification of the body and other physical characteristics of the starch. In practically all instances where the starch was treated with materials that would not affect the edible properties, or modify the body of the starch, the treatment has not effected the desired sterilization.

After extensive research on this problem we have discovered and developed a process that is markedly efficacious for producing the sterilized starch that is substantially free of thermophilic bacteria as well as other living organisms and have introduced this process into commercial operations of the wet milling of corn so as not to require any additional equipment or processing of the milled starch. The product resulting from this treatment with hydrogen peroxide shows substantially complete freedom from all thermophilic spores, flat sour spores, thermophilic anaerobic spores and sulphide spoilage spores when tested in accordance with the standards prescribed by the National Canners Association. Although substantially free of all living bacteria this hydrogen peroxide treated starch has for all intents and purposes the same physical and chemical characteristics as common, unmodified starch. Any slight modification in the body of the starch resulting from this treatment is so slight as to be inconsequential and has no adverse effect in the practical uses of the treated starch.

We recognize that peroxides have been used heretofore for treating flour and similar cereal products to eliminate undesirable odor and taste from these products such as rancidity caused by the oil constituent of the flour. Hydrogen peroxide has also been used heretofore for bleaching the flour and other products. None of these prior processes however, has been conceived or developed for producing sterile starch of otherwise substantially unchanged physical characteristics for edible purposes.

In accordance with our present invention we have discovered that if a suitable amount of hydrogen peroxide usually between about 0.05%–0.15% (100% hydrogen peroxide) on a dry weight basis, is incorporated in wet starch, intimately admixed with this starch and then the starch subjected to a drying operation the hydrogen peroxide will act upon the living organisms in the starch during the drying operation and will produce at the end of the operation a substantially sterile starch. The drying operation may be of the conventional type used for drying starch on a commercial basis such as passing the starch downward through a Buell type of drier in which the starch slowly drops from one set of plates to another disposed at different levels in the drier; the drying operation requiring about 1 hour. When used in this manner there is no additional labor or expense involved in the starch processing and the final product is substantially the same as the starch normally dried in this manner except that it is now sterile starch and therefore satisfactory for immediate use without further treatment in canning or for other edible purposes.

According to one illustrative embodiment of our invention which we have found commercially advantageous, the process is carried out as follows. The wet starch containing about 30–50% moisture and at a temperature of about 100–110° F. is conveyed along an open trough by means of a screw conveyor. During this travel there is sprayed onto the starch a 30% peroxide solution diluted with about 4 parts of water. The amount of 100% hydrogen peroxide contained in this solution is about 0.1% of the dry weight of the starch. The sprayed hydrogen peroxide comes into contact with the moving starch while the latter is being mixed or agitated by means of the screw conveyor. This motion of the starch provides thorough and uniform mixing of the hydrogen peroxide with the starch and prevents the formation of lumps.

The wet starch having the hydrogen peroxide solution dispersed throughout its mass is discharged into a fan which blows the wet starch up to the top of the Buell drier. The temperature of the air picking up the starch at this fan is usually about 270° F. At the top of the drier where the wet starch is discharged into the drier the air temperature is about 165° F. At this stage the moisture content of the starch has been reduced from its original content down to about 28%. The rotating shelves or plates in the drier cause the starch to slowly descend down through the drier in the presence of the heated gas which may vary in temperature between about 100° F. to 165° F. and which dries the starch from the moisture content of about 28% down to a moisture content of about 10–15%, that is, about the moisture equivalent to air dried starch.

During the drying of the starch in the drier as above described, the water content of the hydrogen peroxide is liberated and the hydrogen peroxide apparently decomposes to liberate nascent oxygen, which we believe is the primary agent for killing the bacteria in the starch. The dried starch product obtained from the drier is substantially sterile and is promptly packed in a sterilized paper bag or other suitable container to avoid any danger of future contamination.

The physical characteristics of the starch remain essentially unchanged. The slight modification in the body of the starch is substantially negligible but in some cases the slight change may be further minimized by pH adjustment. We have found that the addition of peroxide in an amount of about 0.1% or more of the weight of the starch usually effects a small decrease in the pH value indicating a slight acidic action of the hydrogen peroxide which might affect the body of the starch. In some cases it may be desirable to add a small amount of alkali or alkaline material to the starch to offset this slight lowering of the pH of the starch. For example, the pH of the starch may be adjusted with alkali to a value of about 6.8 or 6.9 so that the final pH of the starch after addition of the hydrogen peroxide will be about 6.5 to 6.6. This adjustment of pH will minimize any tendency of modifying the body of the starch by the action of the hydrogen peroxide.

The availability and low cost of the hydrogen peroxide make it a very desirable agent for treating the starch and we have found from various tests that it possesses the necessary unique properties above described, which are not possessed by a large number of other materials tested. We have found that benzoyl peroxide has some bactericidal properties when used on starch, but is not as desirable as the hydrogen peroxide.

It will be understood that the above described procedure for applying of the peroxide and drying of the starch may be changed and at least some of the benefits of this invention still obtained. For example, the hydrogen peroxide may be applied to previously dried starch, but this is not as desirable a procedure since it requires either additional heating, or storage of the treated product for a period of several days to effect break-down of the hydrogen peroxide and sterilization of the starch.

In addition to the starch referred to above, other forms of starchy materials may be employed in our invention such as starches containing relatively high amounts of proteins. A commercial form of such material is the product produced in the wet milling of corn and known as "mill house" or "table head" starch. Usually this product is subjected to the conventional tabling operation to separate the starch from the protein but more recently processes have been developed for treating this material and utilizing it without the necessity of tabling. The Walsh and Rawlins application Serial No. 172,900, filed November 5, 1937, discloses the treatment of "mill house" starch to free it of soluble proteins and the subsequent partial gelatinization and drying of the material to produce a starch-protein thickener for canned foods. Such material is useful in our invention.

The above thickener material is especially subject to thermophilic bacteria and requires sterilizing treatment to meet the present Canners' requirements. The proteins appear to harbor the bacteria even more than the starch and this starch-protein material, e. g., treated "table head" starch, is difficult to sterilize but we have found that treatment of the material with hydrogen peroxide is effective for killing the bacteria and rendering it substantially sterile. The process may be carried out according to the following illustrative but non-limiting example.

The starch protein material is delivered from the press or suitable dewatering device at a moisture of from 30% to 50% and a temperature of from about 100 to 110° F. into a screw conveyor. Hydrogen peroxide is sprayed on the material in the conveyor in the proportion of approximately 0.1 pound of 100% hydrogen peroxide per 100 pounds of dry substance. The hydrogen peroxide is generally diluted 1 to 4 with water before mixing. The sprayed hydrogen peroxide comes in contact with the moving material while the latter is passing along the conveyor and is mixed by the action of the flights of the conveyor. The wet material after adding the hydrogen peroxide solution uniformly dispersed throughout its entire mass may either be dried in a continuous shelf type or Buell dryer, a belt type dryer such as the Proctor and Schwartz, or a kiln dryer or any other suitable form of dryer.

In addition to applying hydrogen peroxide to the starch-protein cake from a filter press as outlined in the above example, we have found it possible to sterilize the protein starch suspension in a slurry, that is, before this suspension is dewatered, it is handled in process in concentrations generally ranging from 16 to 20 Baumé. We have found that by adding peroxide to the suspension in concentrations of approximately 0.4% to 0.6% of the weight of dry substance in the suspension depending on the dilution that it is possible to kill all the bacteria present in the material. It is necessary to add the additional peroxide in this case in order that the concentration on the particles be sufficiently high to kill all the bacteria. When the material is filtered some of the peroxide is lost on the filtrate and is therefore ineffective. This treating ordinarily is done at about 120 to 130° F. After filtration the product is dried in the usual fashion.

The term "starch" as used in the claims herein is used in a generic sense and covers both the pure forms of starch and also the impure starches containing proteins, such as the "mill house" starch described above.

We claim:

1. A process for making substantially bacteria-free starch comprising applying to wet starch containing about 30% to 50% moisture a solution of hydrogen peroxide in an amount of about 0.05% to 0.15% of the dry weight of the starch and then drying the starch in a heated chamber containing air heated to about 100° F.–165° F.

until the moisture content of the starch is reduced to about 10%–15%.

2. A process as defined in claim 1 in which the hydrogen peroxide is a 30% solution diluted with about 1 to 4 parts of water.

3. A process as defined in claim 1 in which the hydrogen peroxide is applied by spraying onto the wet starch.

4. A process for making substantially bacteria-free starch comprising spraying about 0.4% to 0.6% of hydrogen peroxide into a slurry of starch-protein material, which has been ground and substantially freed of water soluble proteins and has a concentration of about 16 to 20 Baumé and is heated to about 120° F. to 130° F., filtering and finally drying the filtered starch-protein material to a desired moisture content.

5. A process for making substantially bacteria free starch from wet starch containing substantially more than 15% moisture, comprising adjusting the pH of the wet starch to about 6.8 to 6.9, intimately incorporating in the wet starch about 0.05% to 0.15% hydrogen peroxide, based upon the dry weight of the starch, and drying the thus treated starch to reduce the moisture content to an amount not exceeding about 15%, said pH adjustment minimizing any tendency toward modification of the starch due to slight acidic action of the hydrogen peroxide and effecting a final stabilizing pH value of about 6.5 to 6.6 in the finished starch to prevent any further tendency toward modification of the body of the starch.

HERMAN H. SCHOPMEYER.
GEORGE E. FELTON.